(12) United States Patent
Matsuda et al.

(10) Patent No.: US 8,305,852 B2
(45) Date of Patent: Nov. 6, 2012

(54) OPTICAL INFORMATION RECORDING MEDIUM

(75) Inventors: Isao Matsuda, Takasaki (JP); Hironobu Shimizu, Nasushiobara (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 13/058,805

(22) PCT Filed: Aug. 10, 2009

(86) PCT No.: PCT/JP2009/064372
§ 371 (c)(1),
(2), (4) Date: Feb. 11, 2011

(87) PCT Pub. No.: WO2010/021305
PCT Pub. Date: Feb. 25, 2010

(65) Prior Publication Data
US 2011/0134745 A1  Jun. 9, 2011

(30) Foreign Application Priority Data
Aug. 21, 2008 (JP) .................. 2008-212454

(51) Int. Cl.
*G11B 7/00* (2006.01)
(52) U.S. Cl. .................. 369/47.1; 369/47.27
(58) Field of Classification Search ............... 369/275.4, 369/275.3, 44.26, 47.1, 47.27, 94, 59.25, 369/53.22
See application file for complete search history.

(56) References Cited

U.S. PATENT DOCUMENTS

| | | | |
|---|---|---|---|
| 6,661,768 B1 * | 12/2003 | Yumiba et al. ............. 369/275.4 |
| 2005/0094546 A1 | 5/2005 | Katayama et al. |
| 2006/0013988 A1 | 1/2006 | Tauchi et al. |
| 2007/0020139 A1 | 1/2007 | Tauchi et al. |
| 2007/0081437 A1 | 4/2007 | Oshima et al. |
| 2008/0198731 A1 | 8/2008 | Matsuda et al. |
| 2008/0291811 A1 | 11/2008 | Hara et al. |
| 2009/0073866 A1 | 3/2009 | Imai et al. |

FOREIGN PATENT DOCUMENTS

EP      1530209 A1    5/2005
(Continued)

OTHER PUBLICATIONS

The Extended European Search Report issued by the European Patent Office, mailed Mar. 5, 2012, for European counterpart Application No. 09808241.5.

*Primary Examiner* — Nabil Hindi
(74) *Attorney, Agent, or Firm* — Law Office of Katsuhiro Arai

(57) ABSTRACT

Disclosed is an optical information recording medium that can solve a problem that a BCA mark becomes unrecognizable in an optical recording medium including a recording layer using an organic coloring matter. A playback signal in a burst cut area comprises a bright-area amplitude level formed upon the playback of a part where no barcode-shaped mark has been formed, a dark-area amplitude level formed upon the playback of a part where a barcode-shaped mark has been formed, and a maximum amplitude level having a protruded waveform formed upon the reproduction of the edge of a barcode-shaped mark. When a portion intermediate between the maximum amplitude level and the dark-part amplitude level is defined as an intermediate level, the intermediate level is lower than the bright-area amplitude level.

14 Claims, 4 Drawing Sheets

FOREIGN PATENT DOCUMENTS

| | | |
|---|---|---|
| EP | 1617427 A2 | 1/2006 |
| EP | 1746590 A2 | 1/2007 |
| EP | 1811516 A1 | 7/2007 |
| EP | 1956594 A2 | 8/2008 |
| JP | 2007-102984 A | 4/2007 |
| JP | 2007-141420 A | 6/2007 |
| JP | 2007-141420 A1 | 6/2007 |
| JP | 2007-335061 A | 12/2007 |
| JP | 2008-117470 A | 5/2008 |

* cited by examiner

OPTICAL INFORMATION RECORDING MEDIUM

This application is the U.S. National Phase under 35 U.S.C. §371 of International Application PCT/JP2009/064372, filed Aug. 10, 2009, which claims priority to Japanese Patent Application No. 2008-212454, filed Aug. 21, 2008. The International Application was published under PCT Article 21(2) in a language other than English.

TECHNICAL FIELD

The present invention relates to an optical information recording medium of high recording density that uses an organic dye in its recording layer.

BACKGROUND ART

Optical discs and other optical information recording media are becoming popular as information recording media. These optical information recording media include recordable CDs (CD-Rs), each constituted by a light-transmissive resin substrate of 1.2 mm in thickness and 120 mm or 80 mm in diameter on which a reflective layer and recording layer are formed successively. With these optical recording media, data is recorded by forming recording marks via irradiation of a recording laser beam onto the recording layer. In recent years, the market is demanding higher information recording densities. To meet this demand, methods that use a short laser wavelength and an object lens having high numerical apertures (NAs) are considered, and new optical information recording media such as recordable DVDs (DVD±Rs) have developed accordingly. Such DVDs (DVD±Rs) are structured in such a way that two light-transmissive resin substrates of 0.6 mm in thickness are laminated together by sandwiching a reflective layer and recording layer in between, in order to increase the permissible tilt angle of the disc to accommodate its shorter wavelength and higher NA.

In recent years, however, even higher information recording densities are required to record high-definition image data. Accordingly, new optical information recording media have been developed, such as the recordable Blu-ray Disc (BD-R; "Blu-ray Disc" is a registered trademark), that are structured in such a way that a reflective layer and recording layer are formed on the side of a 1.1-mm thick resin substrate where light enters, after which a light-transmissive cover layer of 0.1 mm in thickness is formed on top of the aforementioned side where the reflective and recording layers have been formed. With these optical information recording media, serial numbers, lot numbers and other management information are recorded on individual discs in the form of a barcode for the purpose of manufacturing/storage or distribution/sales management, and used as a means to identify whether or not a given optical disc is by its legitimate manufacturer or distributor. To be specific, a burst cutting area (hereinafter referred to as "BCA") provided on the innermost side of the area of the optical disc where the recording layer is formed is recorded with a barcode-shaped mark (hereinafter referred to as "BCA mark"), and this BCA mark is read by the optical head of a drive designed to play back optical discs. In addition, a part of this BCA mark is used to prevent illegal copying of information. Accordingly, the BCA mark is becoming increasingly important in the domain of optical discs. As described in Japanese Patent Laid-open No. 2007-335061 or Japanese Patent Laid-open No. 2008-117470, a BCA mark is formed in the BCA by melting and removing the reflective layer via laser beam irradiation. The same is true with BD-ROMs, BD-Rs whose recording layer uses an inorganic material, and BD-Rs whose recording layer uses an organic dye.

PRIOR ART LITERATURES

Patent Literature 1 Japanese Patent Laid-open No. 2007-335061

Patent Literature 2 Japanese Patent Laid-open No. 2008-117470

SUMMARY OF THE INVENTION

Problems to be Solved by the Invention

Examples of playback signals of BCA marks are schematically shown in FIGS. 1 and 2. The BCA mark playback signal shown in FIG. 1 represents a BD-ROM or BD-R whose recording layer uses an inorganic material. This BCA mark playback signal has a dark-area amplitude level corresponding to the amplitude level of the location where a BCA mark is formed, and a bright-area amplitude level corresponding to the amplitude level of the location where no BCA mark is formed. The playback apparatus sets a slice level at a position corresponding to 50% of the difference between these bright-area amplitude level and dark-area amplitude level (in other words, at the center between the bright-area amplitude level and dark-area amplitude level). The playback apparatus recognizes the area on the bright-area amplitude level side of this slice level as the bright area, and area on the dark-area amplitude level side of the slice level as the dark area. The BCA mark is recognized by the playback apparatus this way. With BD-ROMs or BD-Rs whose recording layer uses an inorganic material, which all have a "High to Low" recording polarity, the bright-area amplitude level represents a maximum amplitude level. Here, the "High to Low" recording polarity means that the intensity of reflected light of the location where a recording mark is formed by irradiating a recording laser beam becomes lower than the intensity of reflected light of the location where no recording mark is formed.

On the other hand, the BCA mark playback signal shown in FIG. 2 represents a BD-R whose recording layer uses an organic dye. The BCA mark playback signal in FIG. 2 has, in addition to a bright-area amplitude level and a dark-area amplitude level, a maximum amplitude level indicated by a protruded signal having a greater amplitude than the bright-area amplitude level. The playback apparatus sets a slice level at a position corresponding to 50% of the difference between the maximum amplitude level and dark-area amplitude level. The playback apparatus recognizes the area on the maximum amplitude level side of this slice level as the bright area, and area on the dark-area amplitude level side of the slice level as the dark area. Here, as shown in FIG. 2, the location where no BCA mark is formed is also recognized as the dark area if the slice level is higher than the bright-area amplitude level. If this happens, the BCA mark may not be recognized by the playback apparatus.

This phenomenon is due partly to generation of rough edges of the BCA mark, and partly to the "Low to High" recording polarity of the BD-R whose recording layer uses an organic dye. Here, rough edges of the BCA mark are where the reflective layer remained when the BCA mark was formed. This roughening occurs when the metal constituting the reflective layer does not melt easily, or depending on the conditions under which the BCA mark is formed. An example of BCA mark forming conditions is given below. A BCA mark may be formed using a laser beam of 700 to 900 nm in wavelength that forms an oval spot of 30 to 40 µm in long diameter and 0.5 to 2.0 µm in short diameter, as shown in FIG. 3. A mark is recorded while rotating the optical disc and once the disc has rotated once, the spot is moved in the radial direction by a specified feed pitch to form another mark at the position shifted by the feed pitch in the radial direction. By repeating this process, a barcode-shaped BCA mark is formed. At this time, the spots at the edges of the BCA mark have a narrow irregular [constricted] portion, as shown in FIG. 3. This irregular portion may be where the recording layer has been removed due to heat interference.

Accordingly, the rough edges of the BCA mark are probably in the same condition as recording marks used for recording data. Since the recording polarity of a BD-R whose recording layer uses an organic dye is "Low to High," on this disc the intensity of reflected light of the location where a recording mark is formed becomes higher than the intensity of reflected light of the location where no recording mark is formed. When the edges of the BCA mark are played back, therefore, the maximum amplitude level occurs due to a protruded signal having a greater amplitude than the bright-area amplitude level.

It is the object of the present invention to solve the problem of a BCA mark not being recognized on an optical recording medium having a recording layer that uses an organic dye.

Means for Solving the Problems

The present invention proposes an optical information recording medium comprising: a reflective layer formed on top of a circular substrate; recording layer containing an organic dye formed on top of the aforementioned reflective layer; and a light-transmissive layer formed on top of the aforementioned recording layer; and the optical information recording medium further comprises a burst cutting area provided on the innermost side of the area where the aforementioned recording layer is formed and a barcode-shaped mark is formed in this burst cutting area; wherein a playback signal in the aforementioned burst cutting area has a bright-area amplitude level that occurs when the location where no barcode-shaped mark is formed is played back, a dark-area amplitude level that occurs when the location where the barcode-shaped mark is formed is played back, and a maximum amplitude level constituted by a protruded waveform occurring when the edges of the barcode-shaped mark are played back, and 50% of the difference between the aforementioned maximum amplitude level and dark-area amplitude level is lower than the aforementioned bright-area amplitude level.

In other words, the present invention proposes an optical information recording medium wherein if the aforementioned maximum amplitude level is given by Lmax, aforementioned dark-area amplitude level by Ldark, and aforementioned bright-area amplitude level by Lbright, then the middle level, or Lmiddle, is expressed as (Lmax+Ldark)/2 and "Lmiddle<Lbright" is established.

According to an optical information recording medium proposed by the present invention, 50% of the difference between the maximum amplitude level and dark-area amplitude level, or slice level, becomes lower than the bright-area amplitude level. This slice level divides the bright area and dark area, and specifically the bright-area amplitude level side of the slice level is recognized as the bright area. Accordingly, the playback apparatus can recognize the location where a BCA mark is formed as the dark area, and location where no BCA mark is formed as the bright area. This way, the problem of a BCA mark not being recognized can be solved.

Effects of the Invention

The present invention solves the problem of a BCA mark not being recognized on an optical recording medium having a recording layer that uses an organic dye.

BRIEF DESCRIPTION OF THE SYMBOLS

1 Optical information recording medium
2 Substrate
3 Reflective layer
4 Recording layer
5 Light-transmissive layer

MODE FOR CARRYING OUT THE INVENTION

Figure 4:
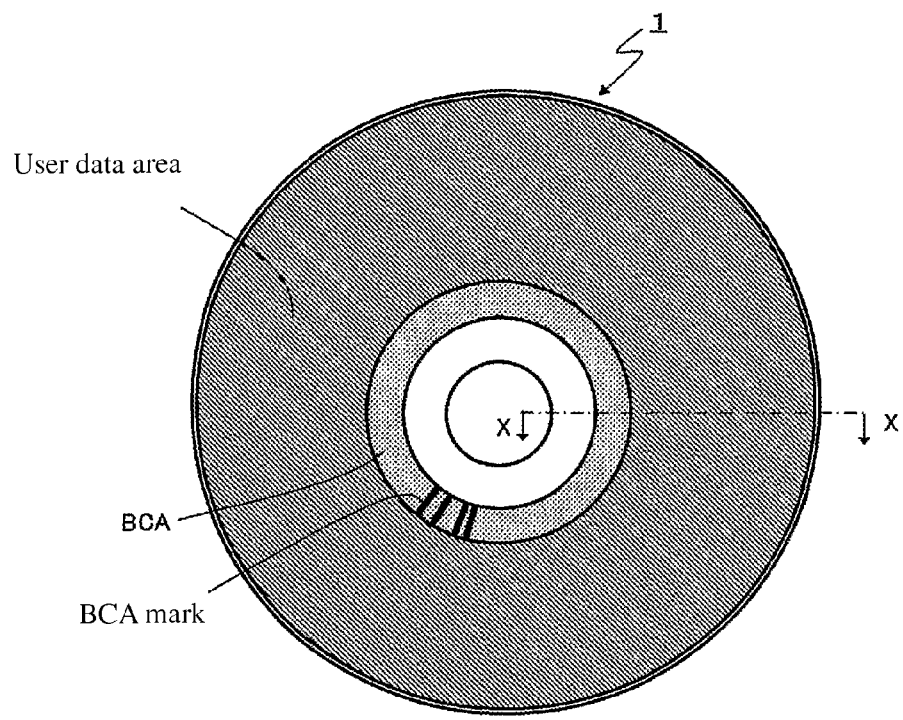
FIG. 4 is a plan view of an optical information recording medium.
Figure 5:
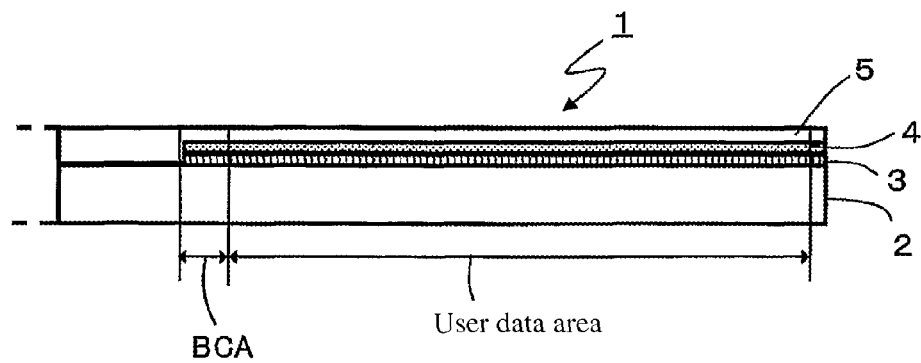
FIG. 5 is a schematic diagram showing an X-X section of FIG. 4.

An embodiment of an optical information recording medium conforming to the present invention is explained using drawings by taking a BD-R as an example. FIG. 4 is a plan view of an optical information recording medium, while FIG. 5 is a schematic diagram showing an X-X section of FIG. 4. The optical information recording medium 1 shown in FIGS. 4 and 5 comprises: a disk-shaped substrate 2 having a through hole at the center as well as a helically formed guide groove (not illustrated) on one side; a reflective layer 3 formed on top of the aforementioned substrate 2; a recording layer 4 formed on top of the aforementioned reflective layer 3 and made of an organic substance containing dye; and a light-transmissive layer 5 formed on top of the aforementioned recording layer 4. To protect the recording layer 4, a protective layer (not illustrated) made of a transparent inorganic material is formed between the recording layer 4 and light-transmissive layer 5. The substrate 2 is a resin substrate of 1.1 mm in thickness (t) and 120 mm in diameter. For this substrate 2, any of the various materials that are used as substrate materials for conventional optical information recording media can be selected and used.

Specific examples include polycarbonate, polymethyl methacrylate and other acrylic resins, polyvinyl chloride, vinyl chloride copolymers and other vinyl chloride resins, epoxy resins, amorphous polyolefins, polyester resins, aluminum and other metals, and glass, among others. They can be combined or mixed or otherwise used in combination, if necessary. Among the aforementioned materials, thermoplastic resins are preferable for their formability, moisture resistance, dimensional stability, low cost, etc., and polycarbonate is especially preferable. Such substrate 2 is formed by injection molding. During the forming process, a stamper is set in the dies and this stamper forms a helical guide groove (not illustrated) on the substrate 2. This guide groove is formed at a pitch of 0.32 μm and recording marks are formed in the guide groove. The reflective layer 3 is a thin metal film of high reflectivity such as one made of Ag alloy, Al alloy, etc., and formed by sputtering, etc. The thickness of the reflective layer 3 should preferably be 55 nm to 65 nm. It is desirable that the reflective layer 3 can be melted and removed easily with a laser beam of 700 to 900 nm in wavelength so that a BCA mark can be formed with ease. Examples of a metal suitable for this reflective layer 3 include Ag—In alloys. In particular, an Ag—In alloy with an In content of 1.0 wt % to 2.0 wt % is preferred.

The recording layer 4 is a layer containing an organic dye that records data as recording marks are formed via laser beam irradiation. For this organic dye, phthalocyanine dye, cyanine dye, azo dye, etc., are preferred. Since the BD-R uses a recording laser beam of 405 nm in wavelength, organic dyes whose absorption peak falls between 300 and 450 nm are used.

The light-transmissive layer 5 is formed by a light-transmissive resin, specifically by shaping a resin that is cured via UV light or radiation into a thickness of 0.1 mm by the spin-coat method, etc. The light transmittance of this light-transmissive layer 5 is 70% or more, or preferably 80% or more, when measured by a spectrophotometer under a light of 405 nm in wavelength based on a thickness of the curable layer of 0.1 mm. This light-transmissive layer 5 is relatively soft and easy to scratch, and therefore a hard coat layer (not illustrated) made of acrylic resin, etc., may be provided on the surface of the side where light enters.

The protective layer (not illustrated) is used to prevent intermixing phenomena such as diffusion of the dye contained in the recording layer 4 to the light-transmissive layer 5 when the light-transmissive layer 5 is formed, or penetration into the recording layer 4 of the solvent for curable resin or other agent used in the formation of the light-transmissive layer 5. Materials that can be used to constitute this protective layer include silicon oxide, especially silicon dioxide, zinc oxide, cerium oxide, yttrium oxide and other oxides; zinc sulfate, yttrium sulfate and other sulfates; silicon nitride and other nitrides; silicon carbide; and mixture of oxide and sulfur compounds, among others. This protective layer is formed by sputtering or other method.

Figure 6:
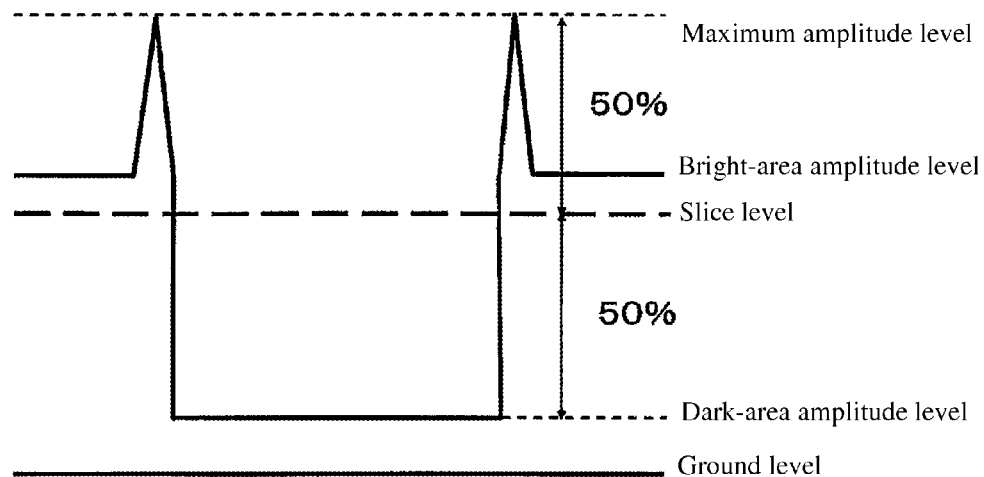
FIG. 6 is a schematic diagram showing a BCA mark playback signal of an optical information recording medium conforming to the present invention.

This optical information recording medium 1 has, in the area where the recording layer 4 is formed, a user data area used by the user to record data and a BCA used to record a BCA mark. Although not illustrated for the purpose of convenience, a read-in area where various types of management data, etc., are recorded is provided on the inner side of the user data area, while a read-out area is provided on the outer side of the user data area. In the BCA of this optical information recording medium 1, a barcode-shaped BCA mark is formed. When the BCA mark formed on the optical information recording medium conforming to the present invention is played back using a playback apparatus, a playback signal like the one shown in FIG. 6 is obtained. The playback signal shown in FIG. 6 has a bright-area amplitude level that occurs when the location where no BCA mark is formed is played back, a dark-area amplitude level that occurs when the location where the BCA mark is formed is played back, and a maximum amplitude level constituted by a protruded waveform occurring when the edges of the BCA mark are played back, and 50% of the difference between the maximum amplitude level and dark-area amplitude level, or slice level, is lower than the bright-area amplitude level.

Since the optical information recording medium conforming to the present invention has its slice level lower than the bright-area amplitude level, as explained above, the playback apparatus recognizes the bright-area amplitude level as the bright area. Accordingly, the location where no BCA mark is formed becomes the bright area, while the location where the BCA mark is formed becomes the dark area, and this way the playback apparatus can recognize the BCA mark.

To make the slice level lower than the bright-area amplitude level, as above, it is necessary to merely suppress the maximum amplitude level constituted by a protruded waveform occurring when the edges of the BCA mark are played back. To be specific, the difference between the maximum amplitude level and bright-area amplitude level is made smaller than the difference between the bright-area amplitude level and dark-area amplitude level. Since each amplitude level is determined by the intensity of reflected light, the maximum amplitude level can be suppressed by suppressing the intensity of reflected light at the edges of the BCA mark. To suppress the intensity of reflected light at the edges of the BCA mark, it is necessary to lower the reflectivity at the rough edges of the BCA mark or remove the rough edges of the BCA mark as much as possible.

The first method to suppress the maximum amplitude level is to use, for the reflective layer, a metal that can easily be melted and removed by a laser beam of 700 to 900 nm in wavelength. If the metal film of the reflective layer remains at the edges of the BCA mark due to removal of the dye in the recording layer, the intensity of light reflected from the metal film determines the maximum amplitude level of the BCA mark playback signal. If the reflective layer uses a metal that can easily be melted and removed by a laser beam of 700 to 900 nm in wavelength, less metal layer remains at the edges of the BCA mark and consequently the intensity of reflected light drops and the maximum amplitude level also drops.

When a BCA mark is formed, the organic dye in the recording layer is removed together with the metal film of the reflective layer. Organic dyes used for BD-Rs have their absorption peak between 300 and 450 nm in order to provide good recording quality with a recording laser beam of 405 nm in wavelength. On the other hand, however, these organic dyes are associated with less absorption when it comes to a laser beam of 700 to 900 nm in wavelength used for forming BCA mark. This means that the sensitivity of the recording layer to the laser beam used for forming BCA mark becomes lower, and therefore the power of this laser beam for forming BCA mark can be increased. It should be noted that the recording layer, although less sensitive to the laser beam for forming BCA mark, still absorbs to some extent and thus heat can be generated when a BCA mark is formed.

Since the metal film of the reflective layer uses a metal of a lower melting point than usual, it can be melted and removed by the power of a laser beam and heat generated from the recording layer. The BCA mark thus formed has less metal film of the reflective layer remaining at its edges, resulting in lower intensity of reflected light and lower maximum amplitude level. Ag—In alloys are favorable metals for the reflective layer, where such alloy with an In content of 1.0 wt % to 2.0 wt % should provide a favorable melting point to achieve the effects intended by the present invention.

Figure 1:
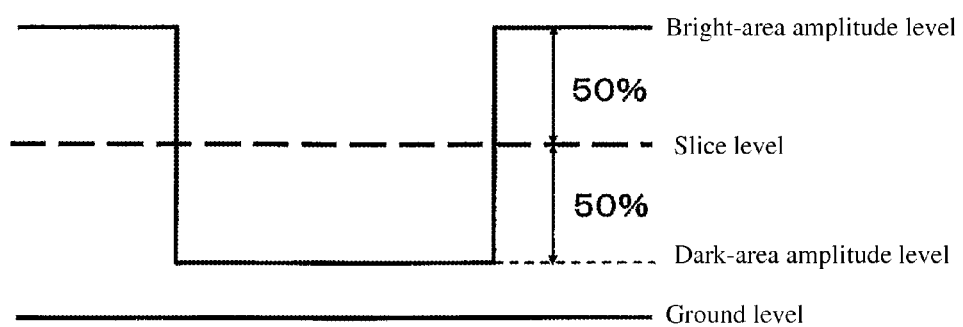
FIG. 1 is a schematic diagram showing a BCA mark playback signal of a BD-ROM or BD-R whose recording layer uses an inorganic material.
Figure 2:
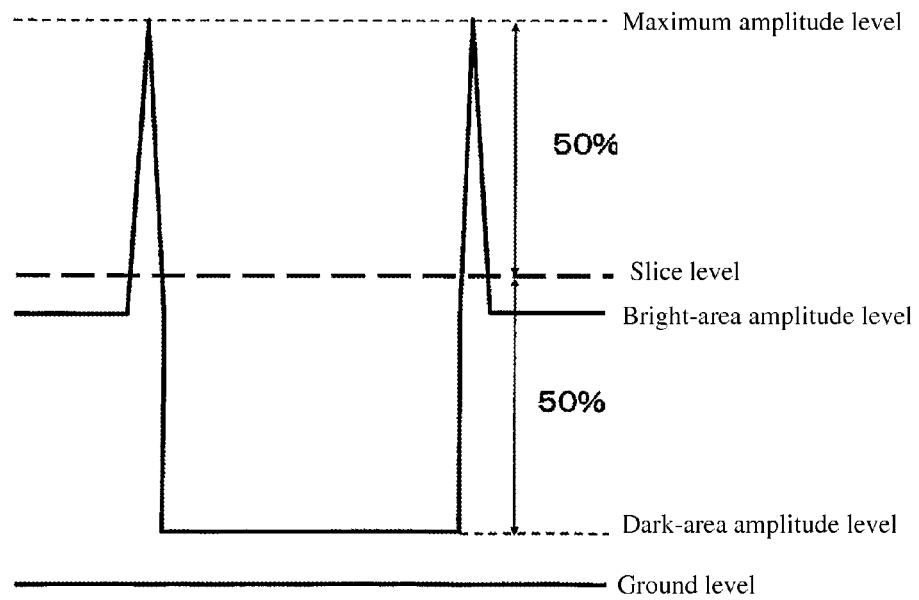
FIG. 2 is a schematic diagram showing a BCA mark playback signal of a BD-R whose recording layer uses an organic dye, representing an example of prior art.
Figure 3:
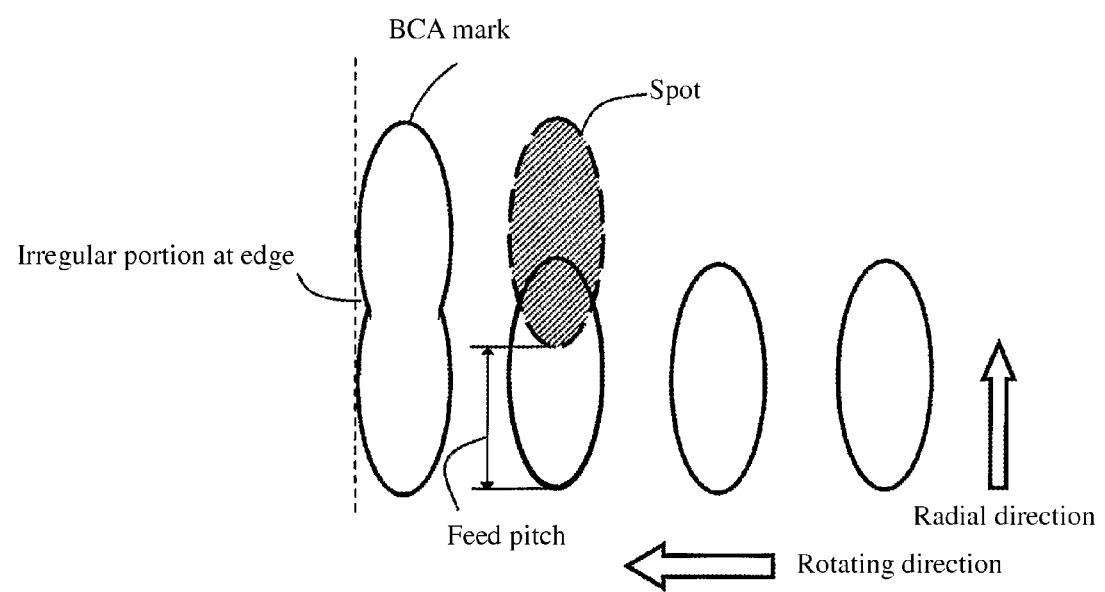
FIG. 3 is a schematic diagram showing how a BCA mark is conventionally formed.
Figure 7:
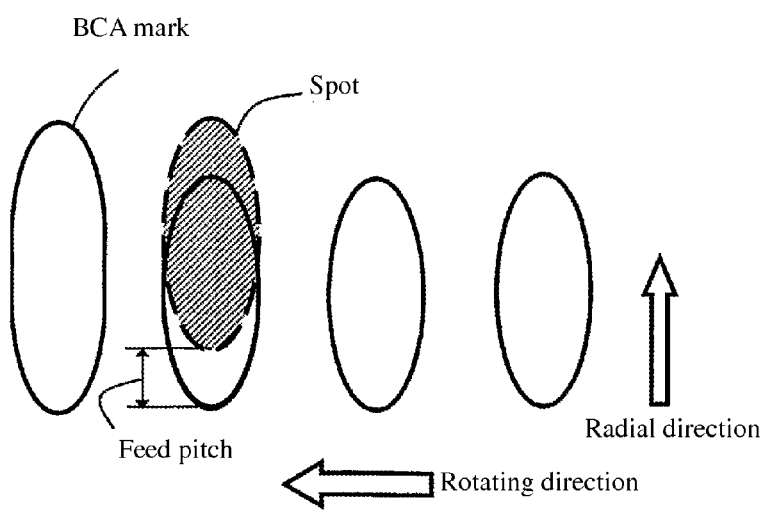
FIG. 7 is a schematic diagram showing how a BCA mark is formed on an optical information recording medium conforming to the present invention.

The second method to suppress the maximum amplitude level is to reduce the spot feed pitch, as shown in FIG. 7. As shown in FIG. 3, a relatively large spot feed pitch causes the edges of the BCA mark to become irregular depending on the amount of overlap with the preceding mark. This irregular portion creates roughness of the edges of the BCA mark.

If the spot feed pitch is reduced, as shown in FIG. 7, irregularity at the edges of the BCA mark becomes smaller. This way, rough edges of the BCA mark can be removed, thereby lowering the intensity of reflected light and suppressing the maximum amplitude level.

It should be noted that a favorable spot feed pitch to achieve the effects intended by the present invention is one-third of the long diameter of the spot or less; in other words, the feed pitch should be 10 μm or less when the long diameter of the spot is 30 μm.

Methods that can be used to achieve an optical information recording medium conforming to the present invention were explained, but the first method and second method may be applied together. By suppressing the maximum amplitude level this way, the difference between the maximum amplitude level and bright-area amplitude level can be made smaller than the difference between the bright-area amplitude level and dark-area amplitude level.

The invention claimed is:

1. An optical information recording medium comprising: a reflective layer formed on top of a circular substrate; a recording layer containing an organic dye formed on top of the reflective layer; and a light-transmissive layer formed on top of the recording layer; said optical information recording medium further comprising a burst cutting area provided on an inner side of the area where the recording layer is formed and a barcode-shaped mark is formed in the burst cutting area; said optical information recording medium being characterized in that a playback signal in the burst cutting area has a bright-area amplitude level that occurs when the location where no barcode-shaped mark is formed is played back, a dark-area amplitude level that occurs when the location where the barcode-shaped mark is formed is played back, and a maximum amplitude level constituted by a protruded waveform occurring when edges of the barcode-shaped mark are played back, and when a slice level is defined as a level equally distant from and set between the maximum amplitude level and dark-area amplitude level, the slice level is lower than the bright-area amplitude level so as to detect a location corresponding to the bright-area amplitude level where no barcode-shaped mark is formed.

2. The optical information recording medium according to claim 1, wherein the reflective layer is constituted by a metal easily removable by a laser beam of 700 to 900 nm in wavelength, thereby lowering the maximum amplitude level.

3. The optical information recording medium according to claim 2, wherein the metal is an Ag—In alloy.

4. The optical information recording medium according to claim 3, wherein the Ag—In alloy contains 1.0 to 2.0 wt % of In.

5. The optical information recording medium according to claim 1, wherein the barcode-shaped mark is constituted by multiple marks aligned and overlapping each other, each produced by a spot light beam intermittently moving at a spot feed pitch, wherein the multiple marks overlap each other to a certain extent such that there is substantially no narrow irregular or constricted part formed by overlapping portions of the multiple marks.

6. The optical information recording medium according to claim 5, wherein a length of the overlapping portions is ⅔ or greater of a length of each mark of the multiple marks along a longitudinal direction.

7. The optical information recording medium according to claim 2, wherein the barcode-shaped mark is constituted by multiple marks aligned and overlapping each other, each produced by a spot light beam intermittently moving at a spot feed pitch, wherein the multiple marks overlap each other to a certain extent such that there is substantially no narrow irregular or constricted part formed by overlapping portions of the multiple marks.

8. The optical information recording medium according to claim 3, wherein the barcode-shaped mark is constituted by multiple marks aligned and overlapping each other, each produced by a spot light beam intermittently moving at a spot feed pitch, wherein the multiple marks overlap each other to a certain extent such that there is substantially no narrow irregular or constricted part formed by overlapping portions of the multiple marks.

9. An optical information recording medium comprising: a reflective layer formed on top of a circular substrate; a recording layer containing an organic dye formed on top of the reflective layer; and a light-transmissive layer formed on top of the recording layer; said optical information recording medium further comprising a burst cutting area provided on an inner side of the area where the recording layer is formed and a barcode-shaped mark is formed in the burst cutting area; said optical information recording medium being characterized in that a playback signal in the burst cutting area has a bright-area amplitude level that occurs when the location where no barcode-shaped mark is formed is played back, a dark-area amplitude level that occurs when the location where the barcode-shaped mark is formed is played back, and a maximum amplitude level constituted by a protruded waveform occurring when edges of the barcode-shaped mark are played back, and when the middle between the maximum amplitude level and dark-area amplitude level is defined as a middle level, the middle level is lower than the bright-area amplitude level, wherein the barcode-shaped mark is constituted by multiple marks aligned and overlapping each other, each produced by a spot light beam intermittently moving at a spot feed pitch, wherein the multiple marks overlap each other to a certain extent such that there is substantially no narrow irregular or constricted part formed by overlapping portions of the multiple marks.

10. The optical information recording medium according to claim 9, wherein a length of the overlapping portions is ⅔ or greater of a length of each mark of the multiple marks along a longitudinal direction.

11. An optical information recording medium comprising: a reflective layer formed on top of a circular substrate; a recording layer containing an organic dye formed on top of the reflective layer; and a light-transmissive layer formed on top of the recording layer; said optical information recording medium further comprising a burst cutting area provided on an inner side of the area where the recording layer is formed and a barcode-shaped mark is formed in the burst cutting area; said optical information recording medium being characterized in that a playback signal in the burst cutting area has a bright-area amplitude level that occurs when the location where no barcode-shaped mark is formed is played back, a dark-area amplitude level that occurs when the location where the barcode-shaped mark is formed is played back, and a maximum amplitude level constituted by a protruded waveform occurring when edges of the barcode-shaped mark are played back, and when the middle between the maximum amplitude level and dark-area amplitude level is defined as a middle level, the middle level is lower than the bright-area amplitude level, wherein the reflective layer is constituted by a metal easily removable by a laser beam of 700 to 900 nm in wavelength, thereby lowering the maximum amplitude level, wherein the barcode-shaped mark is constituted by multiple marks aligned and overlapping each other, each produced by a spot light beam intermittently moving at a spot feed pitch, wherein the multiple marks overlap each other to a certain extent such that there is substantially no narrow irregular or constricted part formed by overlapping portions of the multiple marks.

12. The optical information recording medium according to claim 11, wherein the metal is an Ag—In alloy.

13. The optical information recording medium according to claim 12, wherein the Ag—In alloy contains 1.0 to 2.0 wt % of In.

14. The optical information recording medium according to claim 12, wherein the barcode-shaped mark is constituted by multiple marks aligned and overlapping each other, each produced by a spot light beam intermittently moving at a spot feed pitch, wherein the multiple marks overlap each other to a certain extent such that there is substantially no narrow, irregular or constricted part formed by overlapping portions of the multiple marks.

* * * * *